A. HAVENS.
VEHICLE STEERING DEVICE AND ANTIRATTLER.
APPLICATION FILED JAN. 7, 1915.
1,160,888.
Patented Nov. 16, 1915.
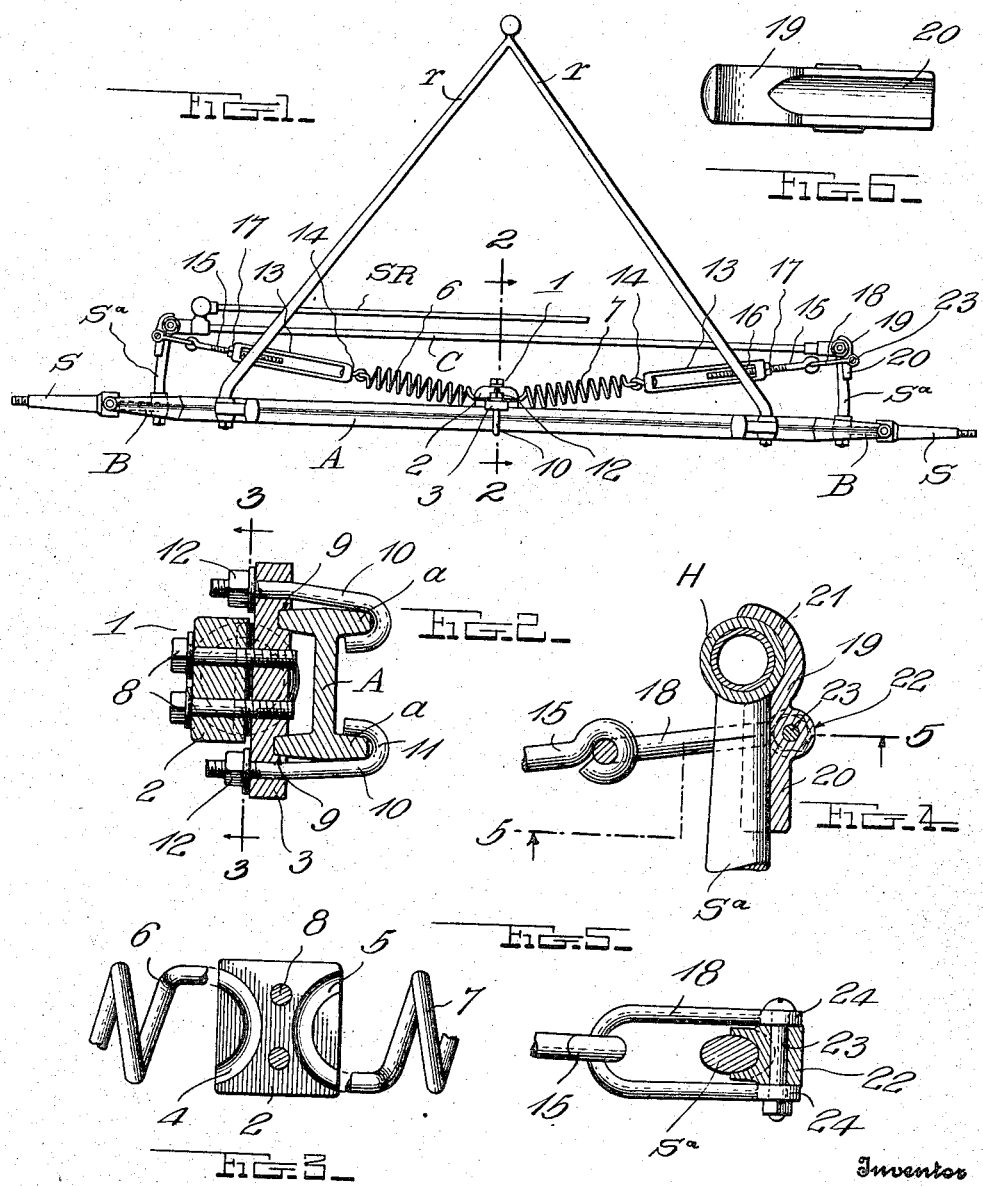

UNITED STATES PATENT OFFICE.

ALONZO HAVENS, OF ELGIN, ILLINOIS, ASSIGNOR OF ONE-HALF TO CHARLES E. SHARP, OF ELGIN, ILLINOIS.

VEHICLE STEERING DEVICE AND ANTIRATTLER.

1,160,888.  Specification of Letters Patent.  Patented Nov. 16, 1915.

Application filed January 7, 1915. Serial No. 977.

*To all whom it may concern:*

Be it known that I, ALONZO HAVENS, a citizen of the United States, residing at Elgin, in the county of Kane and State of Illinois, have invented certain new and useful Improvements in Vehicle Steering Devices and Antirattlers; and I do declare the following to be a full, clear, and exact description of the invention, such as will enable others skilled in the art to which it appertains to make and use the same.

This invention relates to motor vehicles and more particularly to an attachment for the running gear of such vehicles for aiding and guiding the vehicle, reducing jars, taking up vibrations and assisting the vehicle driver in the control of the vehicle.

The object of the invention is to provide a simply constructed and efficient device of this character which may be applied to any make of motor vehicle without drilling any holes and without materially altering the construction of the attachment.

Another object of the invention is to provide a device of this character with improved means for mounting it on a vehicle axle and with simple and readily operated means for adjusting the tension of the springs.

With these and other objects in view, the invention consists of certain novel features of construction, combination and arrangement of parts as will be more fully described and claimed.

In the accompanying drawings: Figure 1 represents a plan view of the front axle of an automobile showing this attachment in operative position thereon; Fig. 2 is a transverse vertical section taken on the line 2—2 of Fig. 1; Fig. 3 is a similar view taken on the line 3—3 of Fig. 2; Fig. 4 is a detail horizontal section of the clamp or other fastening which attaches the device to the spindle arm; Fig. 5 is a transverse section taken on the line 5—5 of Fig. 4; Fig. 6 is a side elevation of the casting which connects the attachment to the spindle arm.

In the embodiment illustrated the attachment constituting this invention is shown applied to a front axle A such as is used on a car known as "The Ford." This axle A is formed of a web plate having flanges $a$ projecting laterally at its top and bottom on each side thereof. The ends of the axle A are provided with the usual brackets B in which are pivotally mounted the axle spindles S having rearwardly extending spindle arms $S^a$ rigidly secured thereto. A coupling rod C is pivoted at its opposite ends to the free ends of the arms $S^a$ and to which a steering rod S R is connected. The usual radius rods $r$ are here shown connected to the axle A but they constitute no part of the invention and therefore no description thereof is deemed necessary.

The attachment constituting this invention comprises an axle engaging member 1 constructed to be adjustably mounted on the axle A and as shown is composed of two castings 2 and 3 having registering arcuate seats 4 and 5 in their meeting faces to receive and connect the inner ends of coiled springs 6 and 7 for a purpose to be described. The castings 2 and 3 are secured together in clamping relation by suitable bolts 8 whereby the inner spring ends are securely held.

The casting 3 is provided on its outer face with transversely extending vertically spaced grooves 9 to receive the top and bottom flanges $a$ of the axle A on the side of the axle on which this clamping member 1 is mounted. This casting 3 extends at its ends beyond the casting 2 and is apertured to receive hook-shaped attaching bolts 10, the hooked ends 11 of which engage the flanges $a$ on the axle A on the side opposite to that on which the clamping member 1 is mounted and thereby securely clamp the member 1 to the axle which is accomplished by tightening up the nuts 12 on the threaded ends of the bolts 10 which project through the apertured ends of the casting 3. (See Fig. 2.)

From the above description it will be obvious that by loosening the nuts 12 the member 1 may be adjusted longitudinally on the axle A to position it at any desired point, it being preferably mounted midway the length of said axle for a purpose to be described.

Turn buckles 13 are swiveled to the outer ends of the springs 6 and 7 by eye bolts 14, the eyes of which are engaged with the outer ends of the springs and the shanks of which pass through the inner ends of the buckles and are provided with the usual heads for forming the swiveled connection between the springs and the buckles. Longer eye bolts 15 have threaded engagement with the outer ends of the turn buckles 13 and are designed for connecting the attachment to the spindle arms S$^a$ which is accomplished through means of clevises 18 which are here shown U-shaped and the cross bars of which are pivotally connected with the eyes of the bolts 15 as shown in Figs. 1 and 4. The shanks 16 of the bolts 15 are threaded for the greater portion of their length to adapt the buckles 13 to be adjusted thereon and they are provided outside said buckles with lock nuts 17 for holding the buckles and bolts 15 securely in adjusted position to prevent accidental changing of the adjustment after it has once been set.

The clevises 18 are connected with the spindle arms S$^a$ by means of substantially spoon-shaped members 19, the handle or shank 20 of which is concave on its inner face to closely engage the convex face of the spindle arm to which it is attached as is shown in Fig. 4, and the bowl 21 thereof fits snugly around the cylindrical head H at the free ends of the spindle arms as is shown clearly in Figs. 1 and 4. These castings 19 are thus fitted to the spindle arms and their heads the bowls and shanks being curved in planes at right angles to each other whereby the member is held against longitudinal and transverse movement relatively to said arm and the tension of the springs will hold them against lateral movement relatively to said arms as will be hereinafter described. Apertured ears 22 are formed on the outer sides of the handles or shanks 20 of the members 19 and are designed to receive bolts 23 which pivotally connect the free ends of the arms 24 of the clevises 18 with said castings 19, said clevises straddling the arms and shanks of the castings and provided with eyes for the passage of the bolts. (See Figs. 1 and 5). When this attachment is positioned as above described the tension of the springs 6 and 7 may be adjusted to the desired point by turning the buckles 13 on the rods 15 and then locking them in adjusted position by the nuts 16 and when so adjusted the joints of the spindle will be securely held against rattling, the castings 19 causing the heads H of the spindle arms to closely hug their pivots at one side and thus prevent any wabbling at this point. The springs also exert their action to normally hold the axle spindles in line with each other and with the axle, and thereby facilitate the operation of steering as they restore the axle spindles to their normal positions when they have been moved to a slight extent by the wheels striking against stones or other obstacles or when they have been turned by the operator. This attachment will also assist the driver in driving a vehicle equipped therewith and will take up any vibration or jar coming upon the wheels as would be the case with the springs omitted and in the event of any breakage of the steering gear, the operator of the machine may have an opportunity to apply the brakes to stop the machine before damage occurs.

I claim as my invention:

1. The combination with a vehicle axle having spindles pivotally mounted thereon and provided with rearwardly extending arms having right angularly disposed heads at their terminals, of coiled springs connected with said axle intermediate of its ends, and members for connecting said springs with said spindle arms each of said members having faces curved in planes at right angles to each other for engaging said spindle arms and the head thereof.

2. The combination with a vehicle axle having spindles pivotally mounted thereon and provided with rearwardly extending arms having right angularly disposed heads at their terminals, of coiled springs connected with said axle intermediate of its ends, substantially spoon shaped members mounted on said spindle arms and having the handles and bowls of said members curved in planes at right angles to each other, and adjustable means connecting said members with said springs.

3. The combination with a vehicle axle having spindles pivotally mounted thereon and provided with rearwardly extending arms having right angularly disposed heads at their terminals, of coiled springs connected with said axle intermediate of its ends, members for connecting said springs with said spindle arms each of said members having faces curved in planes at right angles to each other for engaging said spindle arms and the head thereof, an apertured ear extending transversely of each of said members, U-shaped clevises straddling said members and having eyes at their free ends for pivotal connection with said ears and turn buckles connecting said clevises with said springs.

In testimony whereof I have hereunto set my hand in presence of two subscribing witnesses.

ALONZO HAVENS.

Witnesses:
JOHN W. McQUEEN,
ELLA C. WIEDEMANN.